Patented Aug. 27, 1935

2,012,787

UNITED STATES PATENT OFFICE 2,012,787

PROCESS FOR ABSORBING ISOBUTYLENE

Hendrik Willem Huyser and Johannes Andreas van Melsen, Amsterdam, Netherlands, assignors, by mesne assignments, to Shell Development Company, San Francisco, Calif., a corporation of Delaware No Drawing. Application April 4, 1931, Serial No. 527,848. In the Netherlands April 28, 1930

16 Claims. (Cl. 260—156)

Our invention relates to a process for absorbing isobutylene in strong acids and for the production of tertiary butylalcohol and polymers of isobutylene from the absorption products thus obtained.

It is known to absorb olefines in strong acids and to convert the esters thus obtained into the corresponding alcohols by hydrolysis, or into polymers by heating. On chemical grounds it is to be expected that at most so many molecules of olefine will be capable of being bound by 1 molecule of acid as correspond to the basicity of the acid, whilst in general a sufficiently rapid reaction of the olefine with the acid takes place only as long as not more than one molecule of olefine is bound per molecule of acid.

Now it has been found that, in so far as isobutylene is concerned, more than 1 molecule of olefine per molecule of acid can be bound without the speed of reaction being reduced.

Consequently the process according to the invention is characterized by the absorption of more than one molecule of isobutylene per molecule of acid. Furthermore it surprisingly appeared to be possible to absorb even more molecules of isobutylene per molecule of acid than correspond to the basicity figure of the acid. Thus, for example, sulphuric acid, after having already adsorbed two molecules of butylene was effectively caused to take up a further quantity of butylene.

Example 1

Isobutylene is shaken at 0° C. with sulphuric acid of 65% concentration until 2¼ mol. isobutylene are absorbed. The liquid appeared to be still capable of absorbing 1¼ mol. butylene.

The tertiary butylalcohol can be obtained after neutralization and distillation from the acid liquids produced after absorption according to the invention.

Example 2

Technical butylene, containing about 50% isobutylene, is shaken with sulphuric acid of 50% concentration at 18–20° C. After 4 hours already so much isobutylene has been absorbed by the sulphuric acid that after neutralization with ammonia and steam distillation 1.86 molecules of pure tertiary butyl alcohol are obtained per molecule of sulphuric acid.

Example 3

33.6 grams isobutylene (0.6 molecule) are absorbed by a solution prepared by mixing 42.2 g. sulphuric acid of 73.6% concentration with 19 g. isopropylalcohol and thus consisting of 44.4 g. (0.317 molecule) isopropyl sulphuric acid and 16.8 g. water. After neutralization with ammonia, steam distillation and salting out with $K_2CO_3$, 61 g. of an alcohol mixture dried on $K_2CO_3$ were obtained, having a boiling point of 80–83° C. The aforesaid quantity of 61 grams containing 42 g. of tertiary butyl alcohol, which corresponds to a yield of 85% based on the absorbed isobutylene.

It appeared to be quite possible, however, to distill out of the acid liquid, if desired after dilution, whilst hitherto it has been experienced that during the distillation the free acid attacks the alcohols, especially the tertiary alcohols, so that it has already been proposed to neutralize the liquid prior to distillation. The distilling out of the acid liquid according to the invention is preferably effected in such a manner as to ensure a quick removal of the vapours, e. g. by distillation with steam and/or under reduced pressure.

Further it has been found that the yield of the alcohol is unfavourably affected by an excessive acid concentration of the liquid to be distilled, mainly because in the case of a more concentrated acid the polymerization of the isobutylene predominates. In general an excellent yield of alcohol is obtained with a sulphuric acid concentration of less than 40%.

The yield of alcohol likewise appears to be influenced by the ratio of the absorbed olefine and acid. Calculated on the number of molecules of acid, the yield of the alcohol constantly increases with the number of molecules of isobutylene absorbed; calculated on the butylene absorbed, the maximum yield is obtained at a ratio of approximately 2–3 mol. isobutylene to 1 mol. sulphuric acid, after which it gradually decreases.

In connection with the above the distillation according to the invention is preferably carried out with a liquid diluted to a sulphuric acid concentration not exceeding about 40% calculated on the water present, whilst likewise with a view to the yield of alcohol according to the invention the distillation will be effected with a liquid containing not more than about three mol. olefine per 1 mol. sulphuric acid.

Example 4

50 grams isobutylene were shaken for 2 hours at 18° C. with 75 grams sulphuric acid of 60% concentration (1.92 mol. isobutylene to 1 mol. $H_2SO_4$), diluted with 52 cc. water, so that a complete hydrolysis resulted in a sulphuric acid of 40% concentration, and distilled under atmospheric pressure. The yield was 44.5 grams tertiary butylalcohol dried on $K_2CO_3$ (63% of the theoretical yield), out of which 6 cc. polymers can further be deposited when diluting with 9 volume parts of water. Distillation yielded 3.6 grams isobutylene by decomposition.

Example 5

The experiments of Example 3 was repeated, but this time the tertiary butylalcohol was distilled off in vacuo (4–6 cm. mercury). In this case the quantity produced was 60.5 grams tertiary butylalcohol dried on $K_2CO_3$ (85% of the theoretical yield), which when diluted with 9 vol. water did not separate out any measurable quantity of polymers. Through condensation in liquid nitrogen less than 0.6 gram isobutylene was collected during distillation.

Example 6

52 grams isobutylene were shaken during 2 hours at 18° C. with 75 grams sulphuric acid of 60% concentration (2 mol. isobutylene to 1 mol. $H_2SO_4$). After dilution with water until the sulphuric acid content was reduced to 15%, the tertiary butylalcohol was distilled off at atmospheric pressure. The weight of this alcohol, after drying on $K_2CO_3$, was 63.5 grams (86% of the theoretical yield).

Example 7

The same experiment as in Example 6, but this time the mass was distilled off at a pressure of 4–8 cm. Yield 63 grams alcohol dried on $K_2CO_3$ (85% of the theoretical yield).

Example 8

50 grams isobutylene and 75 grams 60% $H_2SO_4$ (1.92 mol. isobutylene to 1 mol. $H_2SO_4$) were shaken during 2 hours at 18°, neutralized with ammonia and distilled with steam. Yield 60.5 g. tertiary butylalcohol dried on $K_2CO_3$, 85% of the theoretical yield.

Example 9

84 grams isobutylene and 78 grams 65% $H_2SO_4$ (i. e. 2.9 mol. isobutylene to 1 mol. $H_2SO_4$) were shaken during 2 hours at 18°, neutralized with ammonia of 25% strength and distilled with steam. The distillate was salted out with potash and subsequently dried with lime. Yield 88.4 grams pure tertiary butylalcohol (80% of the theoretical yield calculated on isobutylene, 2.4 mol. alcohol to 1 mol. sulphuric acid).

The acid liquids obtained according to the invention can also be worked up into polymers of isobutylene by heating, preferably under pressure, with or without previous dilution. This mainly results in the production of di- and tri-isobutylene.

Example 10

30.2 grams 65% $H_2SO_4$, containing ⅕ gram molecule $H_2SO_4$, absorbed 0.7 gram molecules isobutylene, i. e. 3½ mol. isobutylene per molecule $H_2SO_4$. This solution was diluted with 9.1 grams water, so that the $H_2SO_4$ concentration was reduced to 50%, and heated in a closed tube for 2 hours at 100°. This resulted in the formation of 37 grams polymers (theoretical yield 39.2 grams), viz. 32 grams di-isobutylene and 5 grams tri-isobutylene.

Example 11

The absorption liquid obtained according to Example 9 was heated in a closed tube, without dilution, to 100° and maintained at this temperature for 2 hours. The polymer separated out was fractionated with the following result: to 110° 22 grams, 110–170° 4 grams, 170–180° 10 grams, above 180° less than 1 gram.

Thus, in this case, a little more of the trimeric product was obtained.

It is to be observed that the present invention has been described in connection with certain preferred embodiments thereof. It is to be understood, however, that the invention is not to be limited to these embodiments, and variations and modifications may be resorted to as those skilled in the art will readily understand. For instance, in place of sulfuric acid any other equivalent strong acid may be used and these equivalent acids are to be within the scope of the claims.

What we claim is:

1. The process for the manufacture of absorption products from isobutylene in strong sulphuric acid which comprises absorbing at least approximately as many molecules of isobutylene in strong sulphuric acid as correspond to the basicity of the acid per molecule of acid, said acid having a concentration which is not conducive to the formation of substantial amounts of polymerization products.

2. The process for the manufacture of absorption products from isobutylene in strong sulphuric acid which comprises absorbing at least approximately as many molecules of isobutylene in strong sulphuric acid as correspond to the basicity of the acid per molecule of acid, said acid having a concentration which is not conducive to the formation of substantial amounts of polymerization products, and subjecting the liquid obtained from the foregoing operation to a distillation treatment without previous neutralization of said liquid.

3. The process for the manufacture of absorption products from isobutylene in strong sulphuric acid which comprises absorbing at least approximately as many molecules of isobutylene in strong sulphuric acid as correspond to the basicity of the acid per molecule of acid, said acid having a concentration which is not conducive to the formation of substantial amounts of polymerization products, diluting the liquid obtained from the foregoing operation, and subjecting the diluted liquid to a distillation treatment without previous neutralization of the said liquid.

4. The process for the manufacture of absorption products from isobutylene in strong sulphuric acid which comprises absorbing at least approximately as many molecules of isobutylene in strong sulphuric acid as correspond to the basicity of the acid per molecule of acid, said acid having a concentration which is not conducive to the formation of substantial amounts of polymerization products, subjecting the liquid obtained from the foregoing operation to a distillation treatment without previous neutralization of said liquid, and arranging the condition of distillation so as to insure a quick removal of the evolved vapours.

5. The process for the manufacture of absorption products from isobutylene in strong sulphuric acid which comprises absorbing isobutylene in strong sulphuric acid to an extent of at least approximately two molecules of isobutylene per molecule of sulphuric acid, said acid having a concentration which is non conducive to the formation of substantial amounts of polymerization products, and subjecting the liquid produced by the foregoing operation to a distillation treatment without previous neutralization of the liquid.

6. The process for the manufacture of absorption products from isobutylene in strong sulphuric acid which comprises absorbing isobutylene in strong sulphuric acid to an extent of at least approximately two molecules of isobutylene per molecule of sulphuric acid, said acid having a concentration which is nonconducive to the formation of substantial amounts of polymerization products, diluting the liquid thus obtained to such an extent that the sulphuric acid concentration is not more than 40% as calculated on the water present, and then subjecting the diluted liquid to a distillation treatment without previous neutralization.

7. The process for the manufacture of absorption products from isobutylene in strong sulfuric acid which comprises absorbing at least approximately as many molecules of isobutylene in a strong sulfuric acid as correspond to the basicity of the acid per molecule of acid, said acid having a concentration of about 50% to about 73.7%.

8. The process for the manufacture of absorption products from isobutylene in strong sulfuric acid which comprises absorbing at least approximately as many molecules of isobutylene in a strong sulfuric acid as correspond to the basicity of the acid per molecule of acid, said acid having a concentration of about 50% to about 73.7% and subjecting the liquid obtained from the foregoing operation to a distillation treatment without previous neutralization of said liquid.

9. The process for the manufacture of absorption products from isobutylene in strong sulfuric acid which comprises absorbing at least approximately as many molecules of isobutylene in a strong sulfuric acid as correspond to the basicity of the acid per molecule of acid, said acid having a concentration of about 50% to about 73.7%, diluting the liquid obtained from the foregoing operation, and subjecting the diluted liquid to a distillation treatment without previous neutralization of the said liquid.

10. The process for the manufacture of absorption products from isobutylene in strong sulfuric acid which comprises absorbing at least approximately as many molecules of isobutylene in a strong sulfuric acid as correspond to the basicity of the acid per molecule of acid, said acid having a concentration of about 50% to about 73.7%, and subjecting the liquid obtained from the foregoing operation to a distillation treatment without previous neutralization of said liquid, and arranging the conditions of distillation so as to ensure a quick removal of the evolved vapours.

11. The process for the manufacture of absorption products from isobutylene in strong sulfuric acid which comprises absorbing isobutylene in strong sulphuric acid to an extent of at least approximately two molecules of isobutylene per molecule of sulphuric acid, said acid having a concentration of about 50% to about 73.7%, and subjecting the liquid produced by the foregoing operation to a distillation treatment without previous neutralization of the liquid.

12. The process for the manufacture of absorption products from isobutylene in strong sulfuric acid which comprises absorbing isobutylene in strong sulphuric acid to an extent of at least approximately two molecules of isobutylene per molecule of sulphuric acid, said acid having a concentration of about 50% to about 73.7% diluting the liquid thus obtained to such an extent that the sulphuric acid concentration is not more than 40% as calculated on the water present, and then subjecting the diluted liquid to a distillation treatment without previous neutralization.

13. The composition of matter which consists of a strong sulphuric acid having a concentration which is not conducive to the formation of substantial amounts of polymerization products and containing at least approximately as many molecules of isobutylene as correspond to the basicity of the acid per molecule of acid.

14. The composition of matter which consists of a strong sulfuric acid of about 50% to about 73.7% concentration containing at least approximately as many molecules of isobutylene as correspond to the basicity of the acid per molecule of acid.

15. The composition of matter which consists of a strong sulphuric acid of about 50% to about 73.7% concentration containing at least approximately two molecules of isobutylene per molecule of sulphuric acid.

16. The composition of matter which consists of sulphuric acid of about 50% to about 73.7% concentration containing at least approximately two molecules of isobutylene per molecule of sulphuric acid and diluted to such an extent that the sulphuric acid concentration is not more than 40% as calculated on the water present.

HENDRIK WILLEM HUYSER.
JOHANNES ANDREAS van MELSEN.